US008876080B2

(12) United States Patent
Lin

(10) Patent No.: US 8,876,080 B2
(45) Date of Patent: Nov. 4, 2014

(54) ANTITHEFT DEVICE

(71) Applicant: Lintex Co., Ltd., Yuanlin Township, Zhanghua County (TW)

(72) Inventor: Chia-Sheng Lin, Yuanlin Township, Zhanghua County (TW)

(73) Assignee: Lintex Co., Ltd., Zhanghua County (TW)

( * ) Notice: Subject to any disclaimer, the term of this patent is extended or adjusted under 35 U.S.C. 154(b) by 32 days.

(21) Appl. No.: 13/777,966

(22) Filed: Feb. 26, 2013

(65) Prior Publication Data

US 2014/0239144 A1 Aug. 28, 2014

(51) Int. Cl.
*F16M 13/00* (2006.01)
*E05B 73/00* (2006.01)

(52) U.S. Cl.
CPC ......... *E05B 73/0005* (2013.01); *E05B 73/0082* (2013.01)
USPC .......................................... 248/551; 248/553

(58) Field of Classification Search
CPC .... E05B 73/005; E05B 73/0082; G06F 21/88
USPC .......................... 248/551, 553; 70/58; 52/292
See application file for complete search history.

(56) References Cited

U.S. PATENT DOCUMENTS

| | | | | |
|---|---|---|---|---|
| 4,022,036 | A * | 5/1977 | Cebuhar | 70/58 |
| 4,579,311 | A * | 4/1986 | Spranza, III | 248/553 |
| 4,613,109 | A * | 9/1986 | Boscacci | 248/553 |
| 4,739,637 | A * | 4/1988 | Finkel et al. | 70/58 |
| 5,697,233 | A * | 12/1997 | Albert et al. | 70/58 |
| 5,709,367 | A * | 1/1998 | Heintz et al. | 248/551 |
| 6,740,851 | B2 * | 5/2004 | Woodlief et al. | 219/421 |
| 6,926,244 | B1 * | 8/2005 | O'Neill | 248/346.01 |

* cited by examiner

*Primary Examiner* — Amy Sterling

(57) ABSTRACT

An antitheft device includes a cover, a base plate, and an adhesive element. The base plate is located in a receiving space of the cover and is adapted for a controlling element to connect thereto to release or lock the cover and the base plate. The base plate is able to be adhered onto an object to be secured by the adhesive element. The adhesive element is also located in the receiving space of the cover so that the adhesive element is prevented from being removed or broken easily.

16 Claims, 8 Drawing Sheets

ANTITHEFT DEVICE

BACKGROUND OF THE INVENTION

1. Field of the Invention

The present invention relates to an antitheft device adapted for securing an object from being stolen.

2. Description of the Prior Art

A conventional antitheft device for securing a computer comprises a lock and a string. The string is connected with the lock and is able to be sleeved around a fixed object, such as a table leg. Thereafter, the lock is positioned to a notebook computer so that the notebook computer is secured near the table leg from being stolen.

However, the notebook computer to be secured must form a locking hole having a shape corresponding to the lock. Thus, the antitheft device may not be utilized on products without corresponding locking holes, such as printers, monitors, or cell phones. To secure products without locking holes, string is usually used to wrap or tie the products or to be adhered onto the products. However, surface of the products may be abraded by the string. On the other hand, the string adhered onto the products is unable to be utilized repeatedly, and adhesive may remain on the surface of the products. Furthermore, to facilitate detaching, the adhesive layer is usually exposed outside, so the adhesive layer is easier to be broken so that the antitheft device hardly secures the products.

SUMMARY OF THE INVENTION

The main object of the present invention is to provide an antitheft device which is able to be utilized on objects without locking holes to prevent surface abrasion.

To achieve the above and other objects, an antitheft device of the present invention includes a cover, a base plate, and an adhesive element.

The cover includes a top plate and a flange. The top plate forms a first engaging portion and a hollow portion. The flange extends from a periphery of the top plate toward the base plate. The base plate has a bottom face and a top face. The top face has a second engaging portion and a locking portion. The first engaging portion and the second engaging portion are able to be fixed to each other alternatively so that the base plate and the cover are able to be positioned to each other alternatively. The locking portion is adapted for a controlling element to connect thereto. When the controlling element is connected and fixed to the locking portion, the cover is unable to be separated from the base plate. The adhesive element has two adhesive faces. One of the adhesive faces is adhered onto the bottom face of the base plate, and the other one of the adhesive faces is adapted for adhering onto an object to be secured so that the base plate is fixed on the object. The adhesive element further forms a drawing portion extending therefrom. The drawing portion does not contact the base plate. In addition, the drawing portion is covered by the flange of the cover so that the drawing portion is prevented from being exposed outside.

Thereby, the adhesive element helps the antitheft device be fixed onto surface of an object, and abrasion of the surface of the object is prevented. On the other hand, the adhesive element is entirely covered by the flange of the cover so that the adhesive element is prevented from being exposed outside. Thus, the adhesive element may not be broken easily so that the object is secured better.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Figure 1:
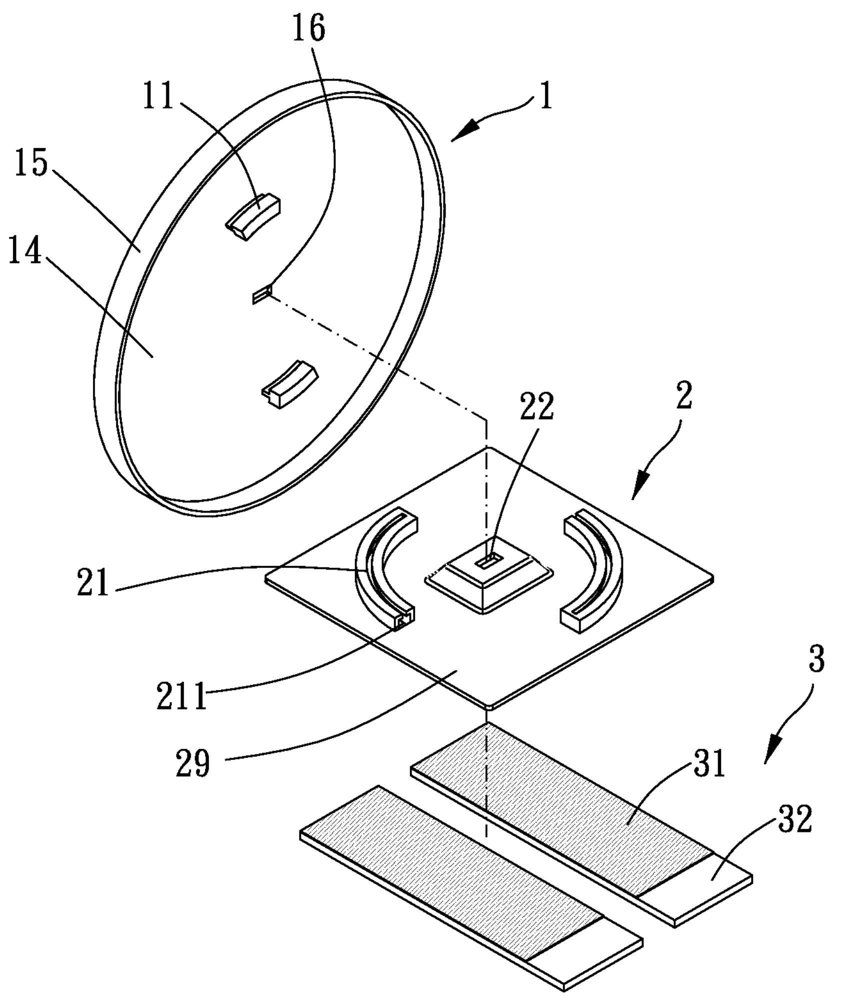
FIG. 1 is a breakdown drawing showing a first embodiment of the present invention.
Figure 2:
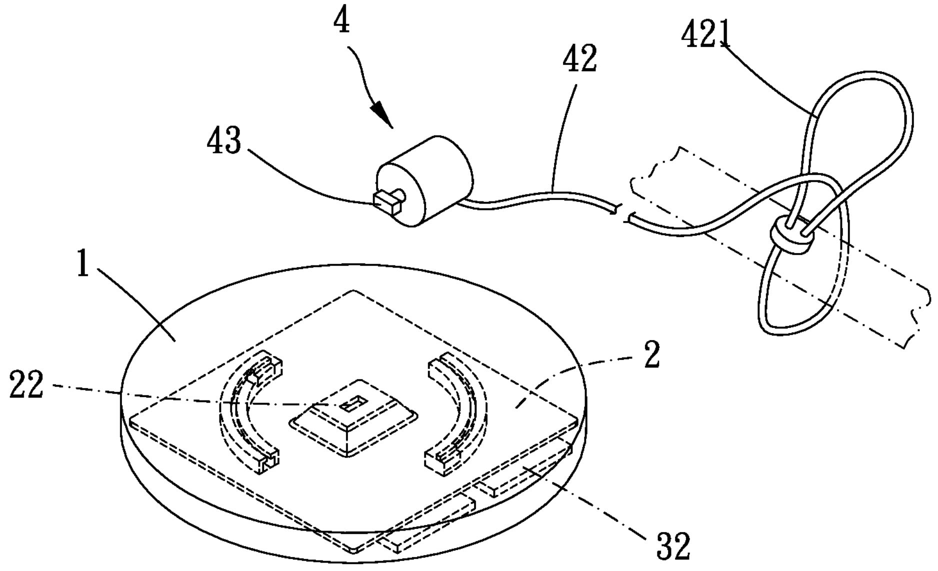
FIG. 2 is an illustration showing a first embodiment of the present invention.
Figure 3:
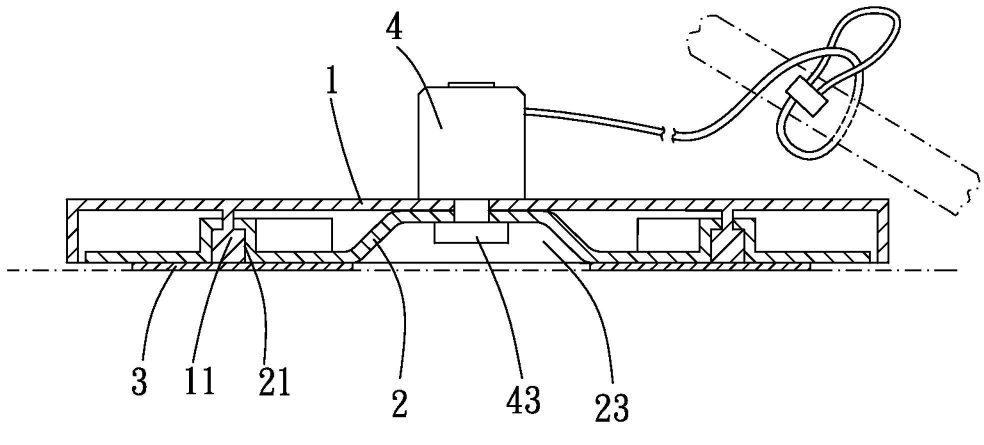
FIG. 3 is a profile showing a first embodiment of the present invention.

Please refer to FIG. 1 to FIG. 3 for a first embodiment of the present invention. The antitheft device of the present embodiment includes a cover 1, a base plate 2, an adhesive element 3, and a controlling element 4.

The cover 1 includes a top plate 14 and a flange 15 extending from a periphery of the top plate 14 toward the base plate 2. A receiving space is enclosed and defined by the top plate 14 and the flange 15. The top plate 14 forms a first engaging portion and a hollow portion 16. The first engaging portion protrudes from the top plate 14 toward the base plate 2. The first engaging portion includes two T-shaped tracks 11. Each T-shaped track 11 has a T-shaped cross-section, and the two T-shaped tracks 11 are arranged symmetrically at two opposite ends of the top plate 14. A longitudinal direction of each T-shaped track 11 is annular. The hollow portion 16 is a square hole.

The base plate 2 is located in the receiving space and has a bottom face and a top face 29. The top face 29 has a second engaging portion and a locking portion. The second engaging portion protrudes from the base plate toward the cover 1.

Specifically, the second engaging portion includes two elongated slots 21. Each elongated slot 21 forms an opening at an end thereof and has a shape corresponding to one of the T-shaped tracks 11. A longitudinal direction of each elongated slot 21 is also annular so that the elongated slot 21 is adapted for one of the T-shaped tracks 11 to enter via the opening Thereby, the tracks 11 are able to move along the elongated slots 21 between a first position and a second position. Due to the annular tracks 11 and elongated slots 21, a user can adjust positions of the tracks 11 with respect to the elongated slots 21 by simply rotating the cover 1. When the tracks 11 are located at the first position, the tracks 11 are restricted by the elongated slots 21 so that the cover 1 and the base plate 2 are positioned to each other. On the contrary, when the tracks 11 are located at the second position, the tracks 11 leave the elongated slots 21 via the opening Without restriction by the elongated slots 21, the cover 1 is able to be separated from the base plate 2.

The locking portion is adapted for the controlling element 4 to connect thereto. When the controlling element 4 is connected and positioned to the locking portion via the hollow portion 16, the cover 1 is unable to be separated from the base plate 2. In the present embodiment, the locking portion is located below the hollow portion and includes a receiving room 23 and an elongated hole 22. A portion of the base plate 2 protrudes toward the cover 1, and the receiving room 23 is formed below the protruded portion. The elongated hole 22 communicates with the receiving room 23. The hollow portion 16 has a corresponding shape with the elongated hole 22. More specifically, the elongated hole 22 is also a square hole, and central axes of the elongated hole 22 and the hollow portion 16 overlaps each other. Thereby, position of the hollow portion 16 with respect to the elongated hole 22 is able to be switched between perpendicular and parallel arrangement by rotating the cover 1 with respect to the base plate 2. When the T-shaped tracks are located at the second position, the hollow portion 16 and the elongated hole 22 overlap each other parallely.

Please refer FIG. 2, the controlling element 4 of the present embodiment includes a string 42 and a locking head 43. The string 42 is adapted for a fixed object to connect thereto. The string 42 forms a ring 421 at an end, and the string 42 can circle around the fixed object and further insert through the ring 421 for positioning. The locking head 43 extends from an end of the controlling element and has a square cross-section. When the T-shaped tracks are located at the second position, the hollow portion 16 and the elongated hole 22 overlap each other parallely so that the locking head 43 is able to enter the receiving room 23 via the hollow portion 16 and the elongated hole 22. In the present embodiment, the controlling element is a lock which is adapted for a key to enter to drive the locking head 43 to rotate so that the locking head 43 is able to rotate with respect to the controlling element 4. In other possible embodiments, the controlling element can be a code lock or other similar devices.

When being rotated by a key, the locking head 43 is able to rotate with respect to the elongated hole 22. When the locking head 43 is rotated to be not parallel to the elongated hole 22, the locking head 43 is unable to be removed from the receiving room 23. Thereby, the cover 1 is blocked by the controlling element 4 so that the cover is unable to be separated from the base plate 2. When the cover 1 is to be separated from the base plate 2, the controlling element 4 has to be removed from the receiving room 23. Also, the cover 1 has to be moved to the second position.

The adhesive element 3 has two opposite adhesive faces 31. One of the adhesive faces 31 is adhered onto the bottom face of the base plate 2, and the other one of the adhesive faces 31 is adapted for adhering onto an object so that the base plate 2 is able to be positioned onto the object. The adhesive element 3 further forms a drawing portion 32 extending therefrom. The drawing portion 32 can be adhesive or non-adhesive. The drawing portion 32 is located in the receiving space and is covered by the flange. Thus, the drawing portion is not exposed outside and does not contact the base plate. Thereby, when the drawing portion 32 is withdrawn laterally, the adhesive element is deformed so that the adhesive element is easy to remove without glue remaining. Because the drawing portion 32 is covered by the cover 1, the cover 1 has to be removed from the base plate 2 before removing the adhesive element 3. Thereby, the adhesive element 3 can not be removed freely.

Figure 4:
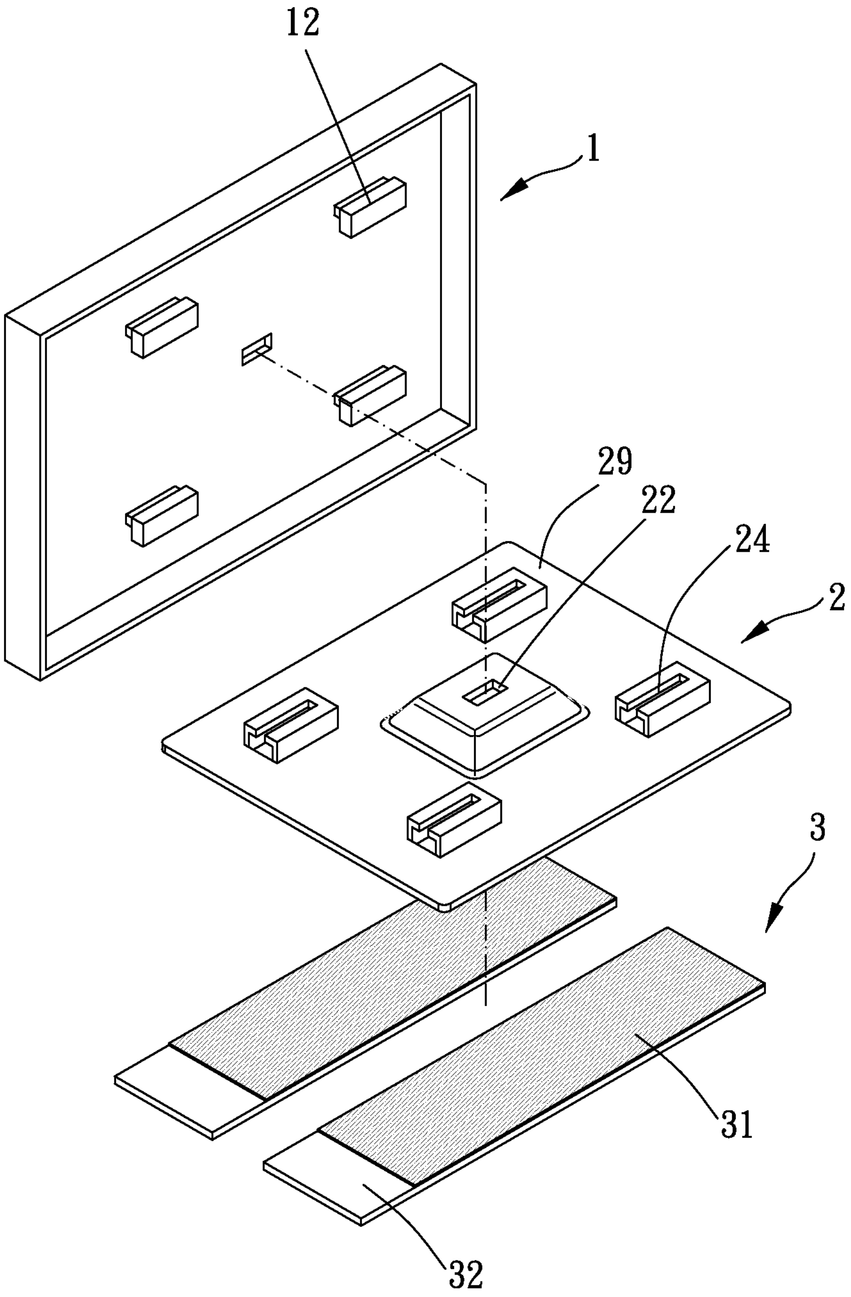
FIG. 4 is a breakdown drawing showing a second embodiment of the present invention.
Figure 5:
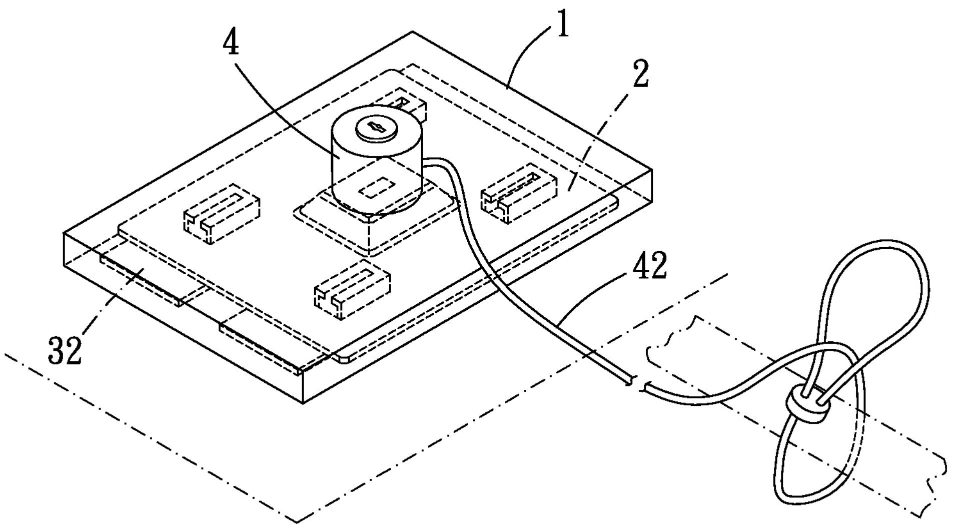
FIG. 5 is an illustration showing a second embodiment of the present invention.
Figure 6:
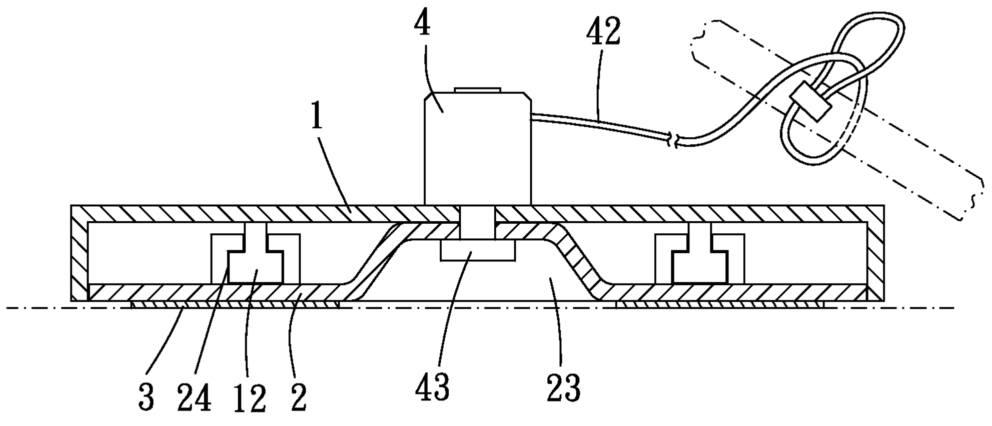
FIG. 6 is a profile showing a second embodiment of the present invention.

Please refer to FIGS. 4 to 6 for a second embodiment of the present invention. Longitudinal directions of the T-shaped track 12 and the elongated slot 24 are linear. Thus, the cover is able to move with respect to the base plate along a linear direction.

Figure 7:
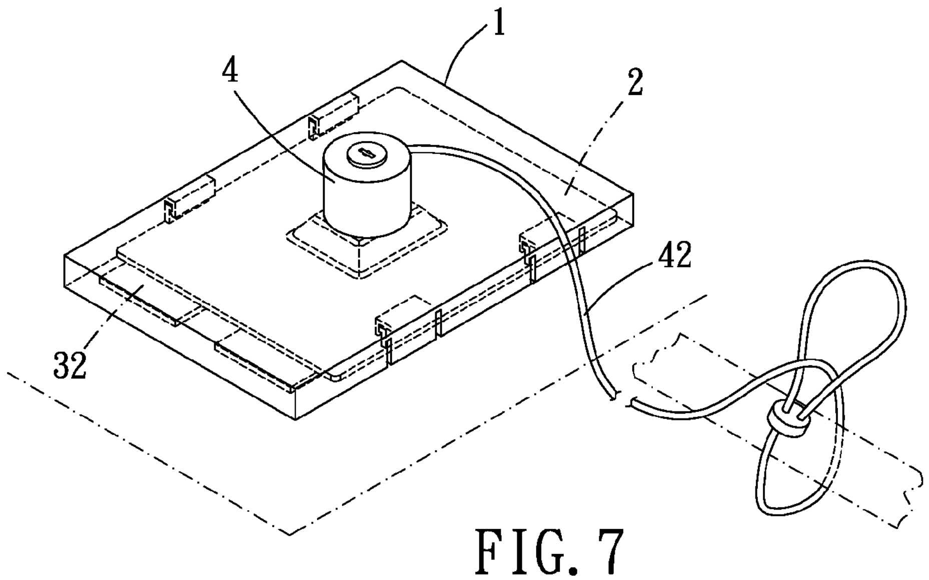
FIG. 7 is an illustration showing a third embodiment of the present invention.
Figure 8:
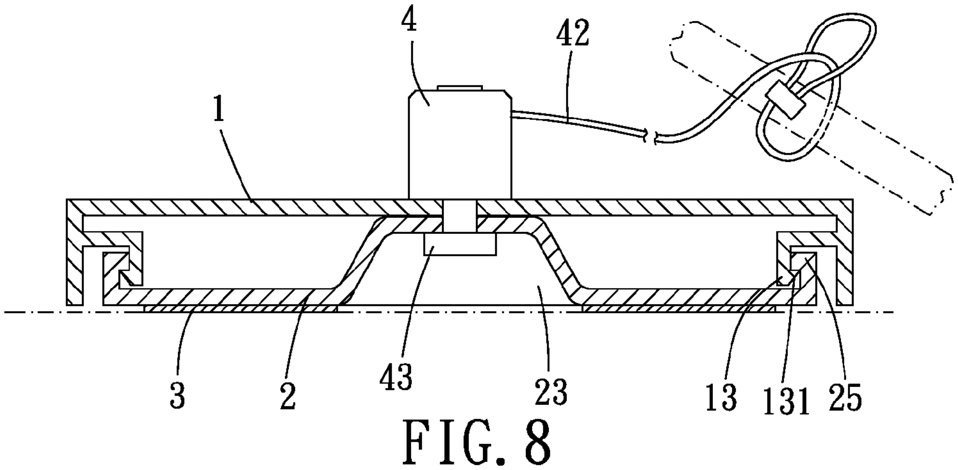
FIG. 8 is a profile showing a third embodiment of the present invention.
Figure 9:
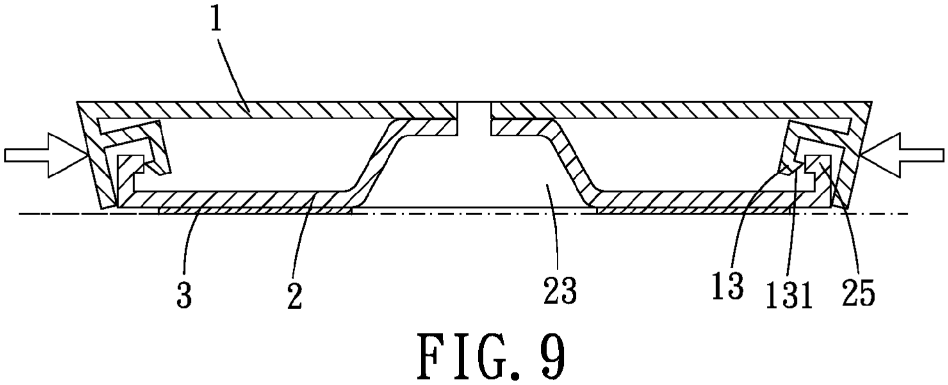
FIG. 9 is a profile during operation showing a third embodiment of the present invention.

Please refer to FIGS. 7 to 9 for a third embodiment of the present invention. The first engaging portion includes two abutting portions 13 arranged at two opposite ends of the cover 1. The cover 1 is slightly deformable. The second engaging portion includes two buckle portions 25 arranged at two opposite ends of the base plate 2. The abutting portions 13 positionally correspond to the buckle portions 25 so that the cover 1 is able to be positioned to the base plate 2, as shown in FIG. 8. To separate the abutting portions 13 from the buckle portions 25, a user can squeeze the cover 1 for deforming so that the abutting portions 25 move away from the buckle portions 25, as shown in FIG. 9. Thereby, the cover 1 is able to be removed from the base plate 2. Specifically, the abutting portions 13 form inclined faces 131. When the cover 1 is to be disposed to the base plate 2, the buckle portions 25 abut against the inclined faces 131 and push it away so that the buckle portions 25 are not restricted by the abutting portions 13 temporarily.

Figure 10:
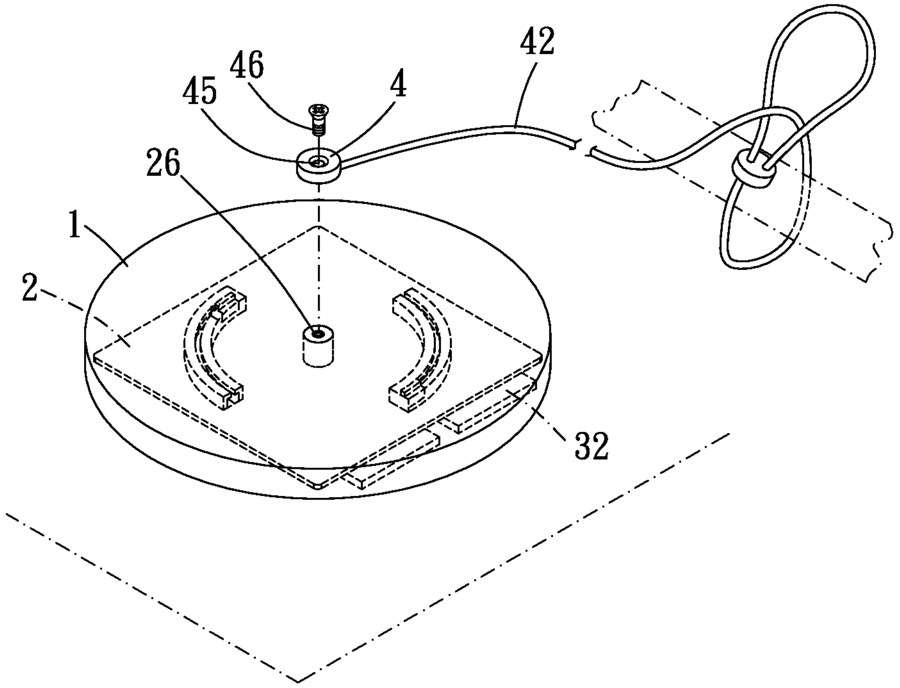
FIG. 10 is an illustration showing a fourth embodiment of the present invention.
Figure 11:
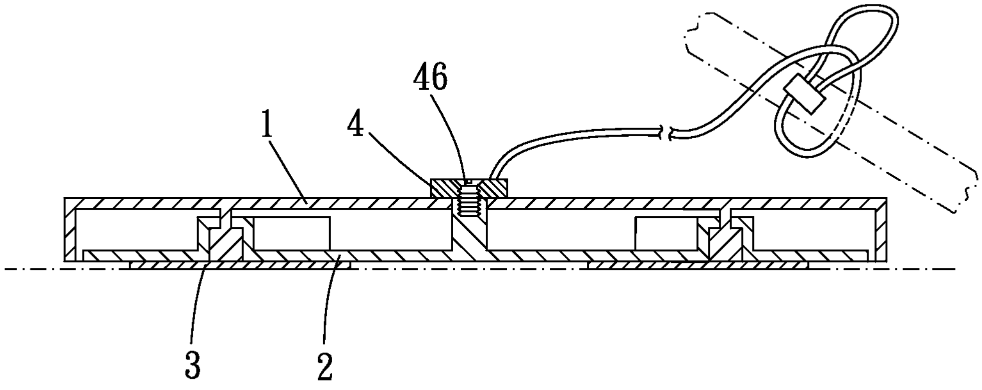
FIG. 11 is a profile showing a fourth embodiment of the present invention.

Please refer to FIGS. 10 and 11 for a fourth embodiment in the present invention. The controlling element 4 has a bolt 46 and a positioning hole 45 wherein the bolt 46 is inserted into the positioning hole 45. The locking portion forms a threaded hole 26 for the bolt to screw therewith. Thereby, the controlling element 4 is able to be positioned to the base plate 2 by a fashion of screwing. Thus, a user can rotate the bolt 46 to release or to position the cover 1 and the base plate 2.

Figure 12:
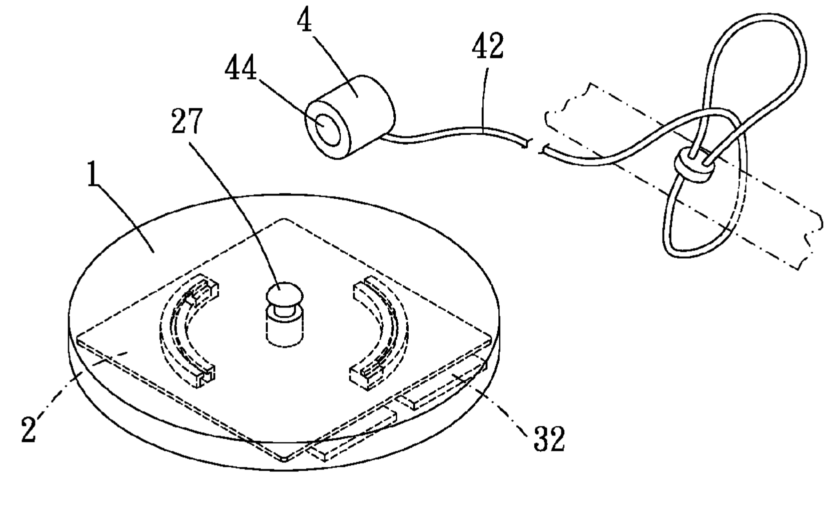
FIG. 12 is an illustration showing a fifth embodiment of the present invention.

Please refer to FIG. 12 for a fifth embodiment of the present invention. The locking portion 27 extends from the base plate 2 toward the cover 1 and further through the hollow portion so as to protrude above the cover. The controlling element 4 includes a restriction portion 44 and a key. The key is able to be inserted into the controlling element 4 to control the restriction portion 44 between an on-mode and an off-mode. The restriction portion 44 is adapted for the locking portion 27 to insert therethrough. When the locking portion 27 is inserted into the restriction portion 44, the key is adapted for release or lock the locking portion 27.

Figure 13:
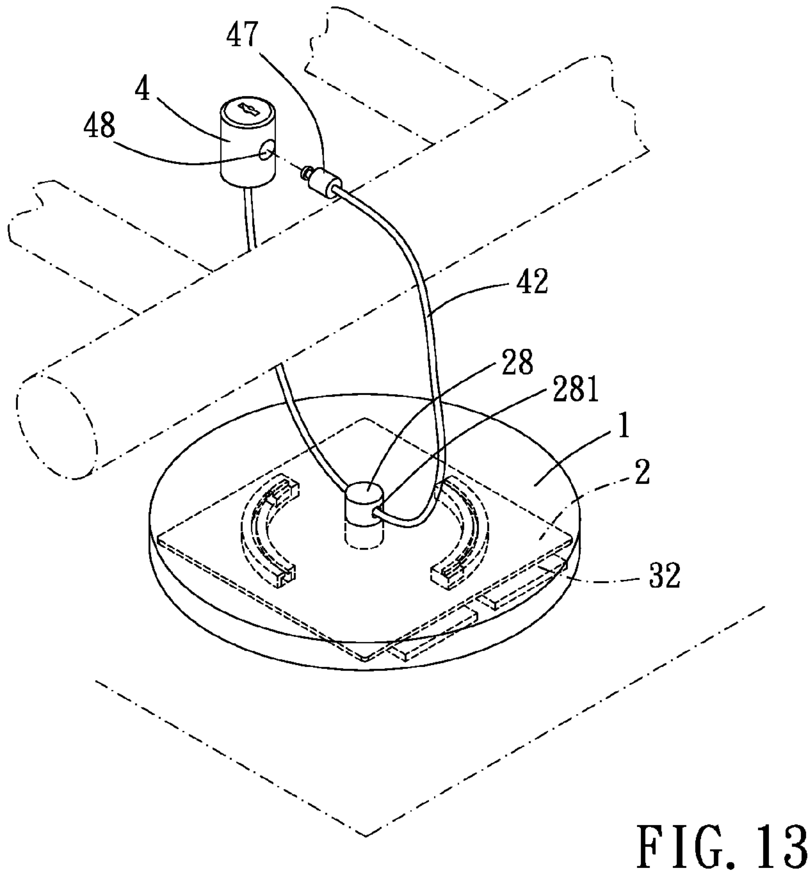
FIG. 13 is an illustration showing a sixth embodiment of the present invention.

Please refer to FIG. 13 for a sixth embodiment of the present invention. The locking portion includes a locking base 28 and a through hole 281. The locking base extends from the base plate 2 toward the cover 1 through the hollow portion. The through hole 281 is formed on the locking base 28 and is adapted for the string 42 to get through. The string 42 has a locking end 47 at an end wherein the locking end 47 is detachably disposed on the controlling element 4. The locking end 47 penetrates the through hole and further returns to the controlling element 4. Due to the string, the cover 1 is unable to be removed from the base plate 2. In the present embodiment, the controlling element 4 is a lock for a key to insert therein. The controlling element 4 forms a connecting portion 48 which is able to lock the locking end 47. Thereby, the connecting portion 48 is able to lock or to release the locking end 47 alternatively by rotating the key.

Figure 14:
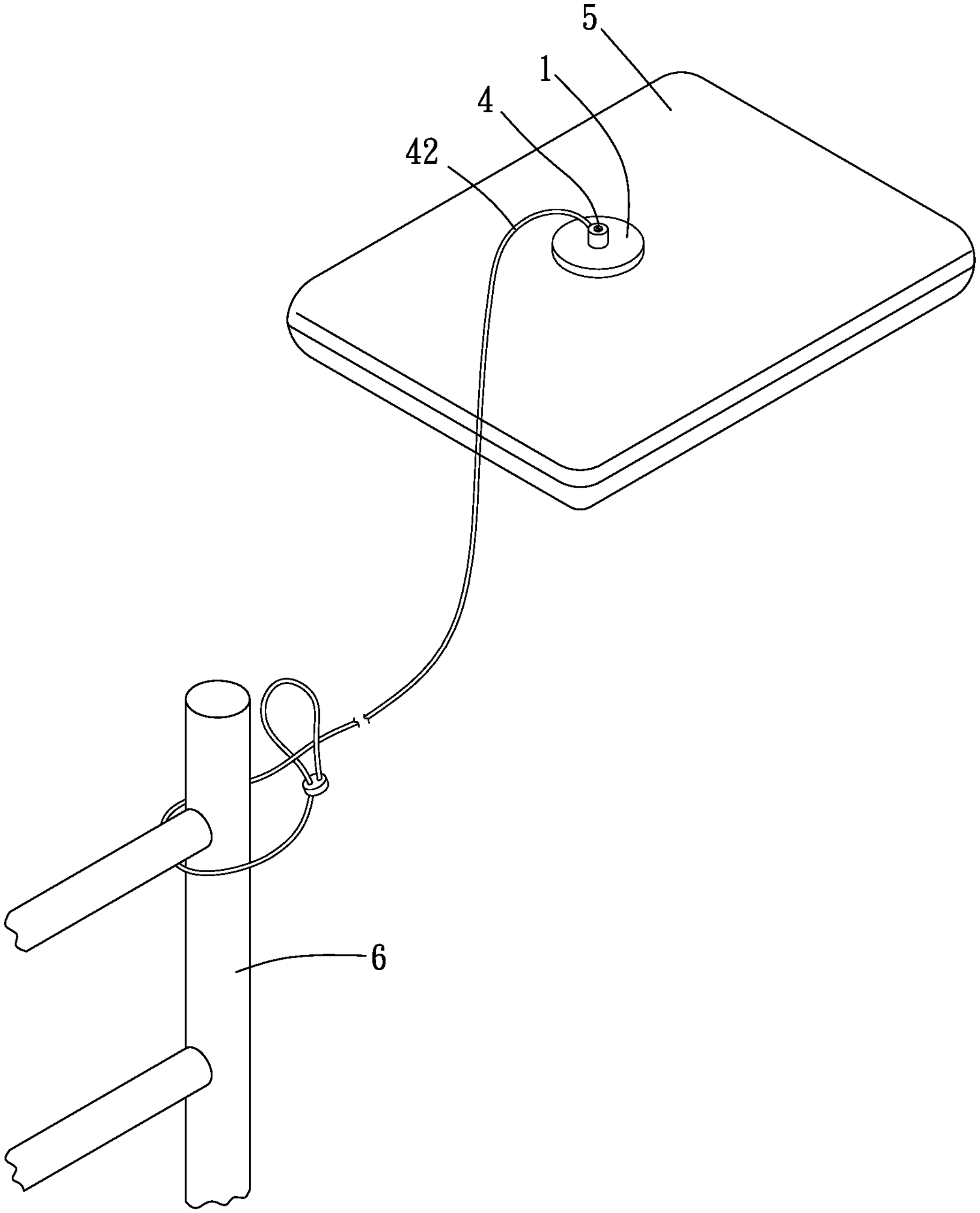
FIG. 14 is an illustration of the present invention.

Please refer to FIG. 14. In practice, if a notebook computer 5 is to be secured, the adhesive element is adhered onto a surface of the notebook computer 5, and the cover 1 is installed onto the base plate 2 to cover the base plate 2 and the adhesive element 3. Thereafter, a user can wrap a table leg (or other fixed object) with the string 42. When the controlling element 4, the cover 1, and the base plate 2 are fixed to each other, the notebook computer 5 is secured around the table leg 6.

In addition, the restriction can be released by releasing the controlling element. On the other hand, to remove the base plate from the notebook computer, a user can separate the cover from the base plate and withdraw the drawing portion to remove the adhesive element. Thereby, the adhesive element may not remain on the surface of the notebook computer.

In conclusion, the present invention is advantageous in that:

1. Any object having surface which is able to be adhered can be secured by the present invention.
2. The adhesive element may not remain on surface of object to be secured, and abrasion on surface of object to be secured is prevented.
3. The drawing portion is not exposed outside so that the adhesive element is unable to be broken easily.

What is claimed is:

1. An antitheft device, including:

a cover, having a top plate and a flange, the top plate forming a first engaging portion and a hollow portion;

a base plate, having a bottom face and a top face, the top face forming a second engaging portion and a locking portion, the first engaging portion and the second engaging portion being able to be fixed to each other alternatively so that the base plate and the cover are able to be fixed to each other alternatively, the locking portion being adapted for a controlling element to connect thereto, the cover being unable to be separated from the base plate when the controlling element is connected and fixed to the locking portion, the flange of the cover extending from a periphery of the top plate of the cover toward the base plate;

an adhesive element, having two adhesive faces, one of the adhesive face being adhered onto the bottom face of the base plate, the other one of the adhesive face being adapted for adhering onto an object so that the base plate is able to be fixed onto the object, the adhesive element forming a drawing portion extending therefrom, the drawing portion not contacting the base plate, the drawing portion being covered by the flange of the cover so that the drawing portion is prevented from being exposed outside.

2. The antitheft device of claim 1, wherein the first engaging portion is able to slide along the second engaging portion between a first position and a second position, the cover is able to be separated from the base plate when the first engaging portion is located at the first position, the first engaging portion and the second engaging portion are fixed to each other when the first engaging portion is located at the second position.

3. The antitheft device of claim 2, wherein one of the first engaging portion and the second engaging portion has a T-shaped cross-section, the other one of the first engaging portion and the second engaging portion is an elongated slot having corresponding shape so that the first engaging portion is able to slide along the second engaging portion.

4. The antitheft device of claim 2, wherein one of the first engaging portion and the second engaging portion has a L-shaped cross-section, the other one of the first engaging portion and the second engaging portion is an elongated slot having corresponding shape so that the first engaging portion is able to slide along the second engaging portion.

5. The antitheft device of claim 3, wherein an extending direction of the first engaging portion is annular.

6. The antitheft device of claim 3, wherein an extending direction of the first engaging portion is linear.

7. The antitheft device of claim 5, wherein the locking portion includes a receiving room, the controlling element includes a locking head, the locking head is movable in the receiving room so that the cover is alternatively positioned to the base plate.

8. The antitheft device of claim 6, wherein the locking portion includes a receiving room, the controlling element includes a locking head, the locking head is movable in the receiving room so that the cover is alternatively positioned to the base plate.

9. The antitheft device of claim 1, wherein the first engaging portion includes two abutting portions, the second engaging portion includes two buckle portions, each buckle portion abuts against one of the abutting portions, the abutting portion is movable with respect to the buckle portion so that the controlling element and the base plate are able to be alternatively positioned to each other.

10. The antitheft device of claim 1, wherein the controlling element is threaded to the locking portion.

11. The antitheft device of claim 1, wherein the locking portion extends from the base plate toward the cover, the controlling element includes a restriction portion, the locking portion is inserted in the restriction portion so that the base plate is unable to be separated from the cover, the restriction portion is movable with respect to the locking portion so that the restriction portion and the locking portion are able to be alternatively positioned to each other.

12. The antitheft device of claim 1, wherein the locking portion has a through hole, the controlling element includes a string, the string is inserted through the through hole and is detachably connected to the controlling element so that the cover is unable to be separated from the base plate.

13. An antitheft device, including:

a cover, having a top plate and a flange, the top plate forming a hollow portion;

a base plate, having a bottom face and a top face, the top face having a locking portion adapted for a controlling element to connect thereto, the cover being unable to be separated from the base plate when the controlling element is connected and fixed to the locking portion, the flange of the cover extending from a periphery of the top plate of the cover toward the base plate;

an adhesive element, having two adhesive faces, one of the adhesive face being adhered onto the bottom face of the base plate, the other one of the adhesive face being adapted for adhering onto an object so that the base plate is able to be fixed onto the object, the adhesive element forming a drawing portion extending therefrom, the drawing portion not contacting the base plate, the drawing portion being covered by the flange of the cover so that the drawing portion is prevented from being exposed outside.

14. The antitheft device of claim 13, wherein the locking portion includes a receiving room, the controlling element includes a locking head, the locking head is movable in the receiving room so that the cover is alternatively positioned to the base plate.

15. The antitheft device of claim 13, wherein the locking portion extends from the base plate toward the cover, the controlling element includes a restriction portion, the locking portion is inserted in the restriction portion so that the base plate is unable to be separated from the cover, the restriction portion is movable with respect to the locking portion so that the restriction portion and the locking portion are able to be alternatively positioned to each other.

16. The antitheft device of claim 13, wherein the locking portion has a through hole, the controlling element includes a string, the string is inserted through the through hole and is detachably connected to the controlling element so that the cover is unable to be separated from the base plate.

* * * * *